United States Patent
Brown Elliott et al.

(10) Patent No.: US 7,598,965 B2
(45) Date of Patent: *Oct. 6, 2009

(54) SUBPIXEL RENDERING FILTERS FOR HIGH BRIGHTNESS SUBPIXEL LAYOUTS

(75) Inventors: Candice Hellen Brown Elliott, Santa Rosa, CA (US); Michael Francis Higgins, Cazadero, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/780,898

(22) Filed: Jul. 20, 2007

(65) Prior Publication Data

US 2007/0257931 A1 Nov. 8, 2007

Related U.S. Application Data

(63) Continuation of application No. 10/821,388, filed on Apr. 9, 2004, now Pat. No. 7,248,268.

(51) Int. Cl.
*G09G 5/00* (2006.01)
(52) U.S. Cl. .................. 345/613; 345/581; 345/589; 345/629
(58) Field of Classification Search .................. 345/613, 345/581, 589, 611, 629
See application file for complete search history.

(56) References Cited

U.S. PATENT DOCUMENTS

| | | |
|---|---|---|
| 3,971,065 A | 7/1976 | Bayer |
| 4,632,514 A | 12/1986 | Ogawa et al. |
| 4,642,619 A | 2/1987 | Togashi |
| 4,751,535 A | 6/1988 | Myers |
| 4,786,964 A | 11/1988 | Plummer et al. |
| 4,800,375 A | 1/1989 | Silverstein et al. |

(Continued)

FOREIGN PATENT DOCUMENTS

DE 197 46 329 A1 3/1999

(Continued)

OTHER PUBLICATIONS

Betrisey, C., et al., Displaced Filtering for Patterned Displays, SID Symp. Digest 1999, pp. 296-299.

(Continued)

*Primary Examiner*—Matthew C Bella
*Assistant Examiner*—Mike Rahmjoo
(74) *Attorney, Agent, or Firm*—Haynes and Boone, LLP

(57) ABSTRACT

A display system comprises a display panel substantially comprising a subpixel repeating group tiled across the panel in a regular pattern. The subpixel repeating group comprises at least one white subpixel and a plurality of colored subpixels. The display system further comprises input circuitry configured to receive input image data indicating an image for rendering on the display panel, and subpixel rendering circuitry configured to compute an output luminance value for each subpixel of said display panel. The subpixel rendering circuitry multiplies data values of a spatial portion of the input image data by at least one image filter kernel which comprises a matrix of coefficients arranged such that each coefficient represents a fractional part of one of said data values of said spatial portion of said input image data. The subpixel rendering circuitry is further configured to sharpen the output luminance values using a luminance signal.

6 Claims, 9 Drawing Sheets

U.S. PATENT DOCUMENTS

| | | |
|---|---|---|
| 4,853,592 A | 8/1989 | Stratham |
| 4,886,343 A | 12/1989 | Johnson |
| 4,965,565 A | 10/1990 | Noguchi |
| 5,006,840 A | 4/1991 | Hamada et al. |
| 5,052,785 A | 10/1991 | Takimoto et al. |
| 5,113,274 A | 5/1992 | Takahashi et al. |
| 5,132,674 A | 7/1992 | Bottorf |
| 5,184,114 A | 2/1993 | Brown |
| 5,196,924 A | 3/1993 | Lumelsky et al. |
| 5,233,385 A | 8/1993 | Sampsell |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,416,890 A | 5/1995 | Beretta |
| 5,450,216 A | 9/1995 | Kasson |
| 5,461,503 A | 10/1995 | Deffontaines et al. |
| 5,485,293 A | 1/1996 | Robinder |
| 5,541,653 A | 7/1996 | Peters et al. |
| 5,563,621 A | 10/1996 | Silsby |
| 5,724,442 A | 3/1998 | Ogatsu et al. |
| 5,731,818 A | 3/1998 | Wan et al. |
| 5,815,101 A | 9/1998 | Fonte |
| 5,818,405 A | 10/1998 | Eglit et al. |
| 5,821,913 A | 10/1998 | Mamiya |
| 5,917,556 A | 6/1999 | Katayama |
| 5,929,843 A | 7/1999 | Tanioka |
| 5,933,253 A | 8/1999 | Ito et al. |
| 5,949,496 A | 9/1999 | Kim |
| 5,987,165 A | 11/1999 | Matsuzaki et al. |
| 5,991,438 A | 11/1999 | Shaked et al. |
| 6,002,385 A | 12/1999 | Silverbrook |
| 6,008,868 A | 12/1999 | Silverbrook |
| 6,023,315 A | 2/2000 | Harrold et al. |
| 6,023,527 A | 2/2000 | Narahara |
| 6,034,666 A | 3/2000 | Kanai et al. |
| 6,049,626 A | 4/2000 | Kim |
| 6,064,424 A | 5/2000 | Van Berkel |
| 6,072,445 A | 6/2000 | Spitzer et al. |
| 6,088,050 A | 7/2000 | Ng |
| 6,097,367 A | 8/2000 | Kuriwaki et al. |
| 6,108,053 A | 8/2000 | Pettitt et al. |
| 6,108,122 A | 8/2000 | Ulrich et al. |
| 6,137,560 A | 10/2000 | Utsumi et al. |
| 6,144,352 A | 11/2000 | Matsuda et al. |
| 6,188,385 B1 | 2/2001 | Hill et al. |
| 6,219,025 B1 | 4/2001 | Hill et al. |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,256,425 B1 | 7/2001 | Kunzman |
| 6,262,710 B1 | 7/2001 | Smith |
| 6,278,434 B1 | 8/2001 | Hill et al. |
| 6,297,826 B1 | 10/2001 | Semba et al. |
| 6,326,981 B1 | 12/2001 | Mori et al. |
| 6,327,008 B1 | 12/2001 | Fujiyoshi |
| 6,332,030 B1 | 12/2001 | Manjunath et al. |
| 6,342,876 B1 | 1/2002 | Kim |
| 6,348,929 B1 | 2/2002 | Acharya et al. |
| 6,360,008 B1 | 3/2002 | Suzuki et al. |
| 6,360,023 B1 | 3/2002 | Betrisey et al. |
| 6,377,262 B1 | 4/2002 | Hitchcock et al. |
| 6,384,836 B1 | 5/2002 | Naylor, Jr. et al. |
| 6,385,466 B1 | 5/2002 | Hirai et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,441,867 B1 | 8/2002 | Daly |
| 6,453,067 B1 | 9/2002 | Morgan et al. |
| 6,459,419 B1 | 10/2002 | Matsubayashi |
| 6,466,618 B1 | 10/2002 | Messing et al. |
| 6,469,766 B2 | 10/2002 | Waterman et al. |
| 6,483,518 B1 | 11/2002 | Perry et al. |
| 6,486,923 B1 | 11/2002 | Maeshima et al. |
| 6,570,584 B1 | 5/2003 | Cok et al. |
| 6,577,291 B1 | 6/2003 | Hill et al. |
| 6,583,787 B1 | 6/2003 | Pfister et al. |
| 6,590,996 B1 | 7/2003 | Reed et al. |
| 6,593,981 B1 | 7/2003 | Haim et al. |
| 6,600,495 B1 | 7/2003 | Boland et al. |
| 6,614,414 B2 | 9/2003 | De Haan et al. |
| 6,624,828 B1 | 9/2003 | Dresevic et al. |
| 6,633,302 B1 | 10/2003 | Ohsawa et al. |
| 6,661,429 B1 | 12/2003 | Phan |
| 6,674,430 B1 | 1/2004 | Kaufman et al. |
| 6,674,436 B1 | 1/2004 | Dresevic et al. |
| 6,681,053 B1 | 1/2004 | Zhu |
| 6,700,991 B1 | 3/2004 | Wu et al. |
| 6,714,243 B1 | 3/2004 | Mathur et al. |
| 6,724,934 B1 | 4/2004 | Lee et al. |
| 6,738,526 B1 | 5/2004 | Betrisey et al. |
| 6,750,874 B1 | 6/2004 | Kim |
| 6,750,875 B1 | 6/2004 | Keely, Jr. et al. |
| 6,771,028 B1 | 8/2004 | Winters |
| 6,781,626 B1 | 8/2004 | Wang |
| 6,801,220 B2 | 10/2004 | Greier et al. |
| 6,804,407 B2 | 10/2004 | Weldy |
| 6,833,890 B2 | 12/2004 | Hong et al. |
| 6,842,207 B2 | 1/2005 | Nishida et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,870,523 B1 | 3/2005 | Ben-David et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,378 B2 | 6/2005 | Cok |
| 6,930,676 B2 | 8/2005 | De Haan et al. |
| 6,937,217 B2 * | 8/2005 | Klompenhouwer et al. ... 345/87 |
| 6,950,156 B1 | 9/2005 | Yoshida |
| 6,989,876 B2 | 1/2006 | Song et al. |
| 7,024,054 B2 | 4/2006 | Cahill et al. |
| 7,027,105 B2 | 4/2006 | Lee et al. |
| 7,110,012 B2 | 9/2006 | Messing et al. |
| 7,123,277 B2 | 10/2006 | Brown Elliott et al. |
| 7,184,066 B2 | 2/2007 | Elliott et al. |
| 7,184,067 B2 | 2/2007 | Miller et al. |
| 2001/0048764 A1 | 12/2001 | Betrisey et al. |
| 2002/0030780 A1 | 3/2002 | Nishida et al. |
| 2002/0054263 A1 | 5/2002 | Kim et al. |
| 2002/0093476 A1 | 7/2002 | Hill et al. |
| 2002/0140831 A1 | 10/2002 | Hayashi |
| 2002/0191130 A1 | 12/2002 | Liang et al. |
| 2003/0011613 A1 | 1/2003 | Booth, Jr. |
| 2003/0034992 A1 | 2/2003 | Brown Elliott et al. |
| 2003/0071775 A1 | 4/2003 | Ohashi et al. |
| 2003/0085906 A1 | 5/2003 | Elliott et al. |
| 2003/0103058 A1 | 6/2003 | Elliott et al. |
| 2003/0117457 A1 | 6/2003 | Qiao |
| 2003/0128179 A1 | 7/2003 | Credelle |
| 2003/0128225 A1 | 7/2003 | Credelle et al. |
| 2003/0128872 A1 | 7/2003 | Lee et al. |
| 2003/0146893 A1 | 8/2003 | Sawabe |
| 2003/0151694 A1 | 8/2003 | Lee et al. |
| 2003/0179212 A1 | 9/2003 | Matsushiro et al. |
| 2003/0218618 A1 | 11/2003 | Phan |
| 2004/0008208 A1 | 1/2004 | Dresevic et al. |
| 2004/0021804 A1 | 2/2004 | Hong et al. |
| 2004/0036704 A1 | 2/2004 | Han et al. |
| 2004/0046725 A1 | 3/2004 | Lee |

| | | | |
|---|---|---|---|
| 2004/0051724 | A1 | 3/2004 | Elliott et al. |
| 2004/0061710 | A1 | 4/2004 | Messing et al. |
| 2004/0085495 | A1 | 5/2004 | Roh et al. |
| 2004/0094766 | A1 | 5/2004 | Lee et al. |
| 2004/0095521 | A1 | 5/2004 | Song et al. |
| 2004/0114046 | A1 | 6/2004 | Lee et al. |
| 2004/0150651 | A1 | 8/2004 | Phan |
| 2004/0169807 | A1 | 9/2004 | Rho et al. |
| 2004/0174389 | A1 | 9/2004 | Ben-David et al. |
| 2004/0179160 | A1 | 9/2004 | Rhee et al. |
| 2004/0189662 | A1 | 9/2004 | Frisken et al. |
| 2004/0189664 | A1 | 9/2004 | Frisken et al. |
| 2004/0196297 | A1 | 10/2004 | Elliott et al. |
| 2004/0222999 | A1 | 11/2004 | Choi et al. |
| 2004/0223005 | A1 | 11/2004 | Lee |
| 2004/0239813 | A1* | 12/2004 | Klompenhouwer ......... 348/638 |
| 2004/0239837 | A1 | 12/2004 | Hong et al. |
| 2004/0263528 | A1* | 12/2004 | Murdoch et al. ............ 345/600 |
| 2005/0031199 | A1 | 2/2005 | Ben-Chorin et al. |
| 2005/0068477 | A1 | 3/2005 | Shin et al. |
| 2005/0083341 | A1 | 4/2005 | Higgins et al. |
| 2005/0083344 | A1 | 4/2005 | Higgins |
| 2005/0083345 | A1 | 4/2005 | Higgins |
| 2005/0083352 | A1 | 4/2005 | Higgins |
| 2005/0083356 | A1 | 4/2005 | Roh et al. |
| 2005/0088385 | A1 | 4/2005 | Elliott et al. |
| 2005/0094871 | A1 | 5/2005 | Berns et al. |
| 2005/0099540 | A1 | 5/2005 | Elliott et al. |
| 2005/0151752 | A1 | 7/2005 | Phan |
| 2005/0169551 | A1 | 8/2005 | Messing et al. |
| 2005/0190967 | A1 | 9/2005 | Ok et al. |
| 2005/0212728 | A1 | 9/2005 | Miller et al. |
| 2005/0219274 | A1 | 10/2005 | Yang et al. |
| 2005/0225548 | A1 | 10/2005 | Han et al. |
| 2005/0225561 | A1 | 10/2005 | Higgins et al. |
| 2005/0225562 | A1 | 10/2005 | Higgins et al. |

FOREIGN PATENT DOCUMENTS

| | | |
|---|---|---|
| DE | 299 09 537 U1 | 10/1999 |
| DE | 199 23 527 | 11/2000 |
| EP | 0 322 106 A2 | 6/1989 |
| EP | 0 793 214 A1 | 2/1996 |
| EP | 0 899 604 A2 | 3/1999 |
| EP | 1 308 923 A1 | 5/2003 |
| JP | 62 127716 | 6/1987 |
| JP | 11-014978 | 1/1999 |
| JP | 2004-004822 | 1/2004 |
| KR | 2003-0086399 | 11/2003 |
| TW | 451171 | 8/2001 |
| TW | 474104 | 1/2003 |
| WO | WO 00/21067 | 4/2000 |
| WO | WO 00/42564 | 7/2000 |
| WO | WO 00/42762 | 7/2000 |
| WO | WO 00/67196 | 11/2000 |
| WO | WO 00/70392 | 11/2000 |
| WO | WO 01/29817 A1 | 4/2001 |
| WO | WO 01/037251 A1 | 5/2001 |
| WO | WO 02/11112 A2 | 2/2002 |
| WO | WO 03/056383 A1 | 7/2003 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |
| WO | WO 2005/057532 A2 | 6/2005 |
| WO | WO 2005/065027 A2 | 7/2005 |
| WO | WO 2005/076257 A2 | 8/2005 |

OTHER PUBLICATIONS

Brown Elliott, C., "Active Matrix Display . . . ", IDMC 2000, 185-189, Aug. 2000.
Brown Elliott, C., "Color Subpixel Rendering Projectors and Flat Panel Displays," SMPTE, Feb. 27-Mar. 1, 2003, Seattle, WA pp. 1-4.
Brown Elliott, C., "Co-Optimization of Color AMLCD Subpixel Architecture and Rendering Algorithms," SID 2002 Proceedings Paper, May 30, 2002 pp. 172-175.
Brown Elliott, C., "Development of the PenTile Matrix™ Color AMLCD Subpixel Architecture and Rendering Algorithms", SID 2003, Journal Article.
Brown Elliott, C., "New Pixel Layout for PenTile Matrix™ Architecture", IDMC 2002, pp. 115-117.
Brown Elliott, C., "Reducing Pixel Count Without Reducing Image Quality", Information Display Dec. 1999, vol. 1, pp. 22-25.
"ClearType magnified", Wired Magazine, Nov. 8, 1999, Microsoft Typography, article posted Nov. 8, 1999, last updated Jan. 27, 1999 1 page.
Credelle, Thomas, "P-00: MTF of High-Resolution PenTile Matrix Displays", Eurodisplay 02 Digest, 2002 pp. 1-4.
Daly, Scott, "Analysis of Subtriad Addressing Algorithms by Visual System Models",SID Symp. Digest, Jun. 2001 pp. 1200-1203.
E-Reader Devices and Software, Jan. 1, 2001, Syllabus, http://www.campus-technology.com/article.asp?id=419.
Feigenblatt, R.I., Full-color imaging on amplitude-quantized color mosaic displays, SPIE, 1989, pp. 199-204.
Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30, 1999 and Jun. 19, 2000, 30 pages.
Klompenhouwer, Michiel, Subpixel Image Scaling for Color Matrix Displays, SID Symp. Digest, May 2002, pp. 176-179.
Michiel A. Klompenhouwer, Gerard de Haan, Subpixel image scaling for color matrix displays, Journal of the Society for Information Display, vol. 11, Issue 1, Mar. 2003, pp. 99-108.
Lee, Baek-woon et al., 40.5L: Late-News Paper: TFT-LCD with RGBW Color system, SID 03 Digest, 2003, pp. 1212-1215.
Martin, R., et al., "Detectability of Reduced Blue-Pixel Count in Projection Displays," SID Symp. Digest, May 1993, pp. 606-609.
Messing, Dean et al., Improved Display Resolution of Subsampled Colour Images Using Subpixel Addressing, IEEE ICIP 2002, vol. 1, pp. 625-628.
Messing, Dean et al., Subpixel Rendering on Non-Striped Colour Matrix Displays, 2003 International Conf on Image Processing, Sep. 2003, Barcelona, Spain, 4 pages.
"Microsoft ClearType," website, Mar. 26, 2003, 4 pages.
Murch, M., "Visual Perception Basics," SID Seminar, 1987, Tektronix Inc, Beaverton Oregon.
Platt, John, Optimal Filtering for Patterned Displays, IEEE Signal Processing Letters, 2000, 4 pages.
PCT International Search Report dated Jun. 3, 2002 for PCT/US02/12610 (U.S. Appl. No. 10/051,612).
PCT International Search Report dated Sep. 30, 2003 for PCT/US02/24994 (U.S. Appl. No. 10/215,843).
PCT International Search Report dated Jun. 14, 2004 for PCT/US03/028222 (U.S. Appl. No. 10/243,094).
PCT International Search Report dated Jul. 11, 2005 for PCT/US05/010022 (U.S. Appl. No. 10/821,388).
Wandell, Brian A., Stanford University, "Fundamentals of Vision: Behavior . . . ," Jun. 12, 1994, Society for Information Display (SID) Short Course S-2, Fairmont Hotel, San Jose, California.
Werner, Ken, "OLEDS, OLEDS, Everywhere . . . ," Information Display, Sep. 2002, pp. 12-15.
USPTO, Non-Final Office Action, dated Feb. 7, 2005 in US Patent No. 7,123,277 (U.S. Appl. No. 10/051,612).
Clairvoyante Inc, Response to Non-Final Office, dated Jul. 7, 2005 in US Patent No. 7,123,27 (U.S. Appl. No. 10/051,612).
USPTO, Final Office Action dated, Aug. 31, 2005 in US Patent No. 7,123,27 (U.S. Appl. No. 10/051,612).
Clairvoyante Inc, Response to Final Office, dated Sep. 19, 2005 in US Patent No. 7,123,27 (U.S. Appl. No. 10/051,612).
USPTO, Non-Final Office Action dated, Dec. 15, 2005 in US Patent No. 7,123,27 (U.S. Appl. No. 10/051,612).
Clairvoyante Inc, Response to Non-Final Office, dated Feb. 8, 2006 in US Patent No. 7,123,27 (U.S. Appl. No. 10/051,612).
USPTO, Notice of Allowance, dated May 4, 2006 in US Patent No. 7,123,27 (U.S. Appl. No. 10/051,612).

USPTO, Non-Final Office Action, dated Jun. 27, 2005 in US Patent Publication No. 2003/0103058, (U.S. Appl. No. 10/150,355).

Clairvoyante Inc, Response to Non-Final Office Action, dated Dec. 22, 2005 in US Patent Publication No. 2003/0103058, (U.S. Appl. No. 10/150,355).

USPTO, Final Office Action, dated Mar. 7, 2006 in US Patent Publication No. 2003/0103058, (U.S. Appl. No. 10/150,355).

Clairvoyante Inc, Response to Non-Final Office Action, dated Jul. 25, 2006 in US Patent Publication No. 2003/0103058, (U.S. Appl. No. 10/150,355).

USPTO, Notice of Allowance, dated Nov. 30, 2006 in US Patent Publication No. 2003/0103058, (U.S. Appl. No. 10/150,355).

USPTO, Non-Final Office Action, dated Mar. 24, 2005 in US Patent No. 7,184,066 (U.S. Appl. No. 10/215,843).

Clairvoyante Inc, Response to Non-Final Office Action, dated Sep. 26, 2005 in US Patent No. 7,184,066 (U.S. Appl. No. 10/215,843).

USPTO, Final Office Action, dated Jan. 25, 2006 in US Patent No. 7,184,066 (U.S. Appl. No. 10/215,843).

Clairvoyante Inc, Response to Non-Final Office Action, dated Jun. 26, 2006 in US Patent No. 7,184,066 (U.S. Appl. No. 10/215,843).

USPTO, Notice of Allowance, dated Jul. 16, 2006 in US Patent No. 7,184,066 (U.S. Appl. No. 10/215,843).

USPTO, Non-Final Office Action, dated May 17, 2005 in US Patent Publication No. 2004/0051724, (U.S. Appl. No. 10/243,094).

Clairvoyante Inc, Response to Non-Final Office Action, dated Nov. 17, 2005 in US Patent Publication No. 2004/0051724, (U.S. Appl. No. 10/243,094).

USPTO, Final Office Action, dated Mar. 8, 2006 in US Patent Publication No. 2004/0051724, (U.S. Appl. No. 10/243,094).

USPTO, Non-Final Office Action, dated Nov. 16, 2004 in US Patent Publication No. 2003/0128225, (U.S. Appl. No. 10/278,353).

Clairvoyante Inc, Response to Non-Final Office Action, dated Apr. 15, 2005 in US Patent Publication No. 2003/0128225, (U.S. Appl. No. 10/278,353).

USPTO, Non-Final Office Action, dated Jul. 12, 2005 in US Patent Publication No. 2003/0128225, (U.S. Appl. No. 10/278,353).

Clairvoyante Inc, Response to Non-Final Office Action, dated Jan. 12, 2006 in US Patent Publication No. 2003/0128225, (U.S. Appl. No. 10/278,353).

USPTO, Final Office Action, dated Apr. 18, 2006 in US Patent Publication No. 2003/0128225, (U.S. Appl. No. 10/278,353).

Clairvoyante Inc, Response to Final Office Action, dated Sep. 18, 2006 in US Patent Publication No. 2003/0128225, (U.S. Appl. No. 10/278,353).

USPTO, Non-Final Office Action, dated Mar. 2, 2007 in US Patent Publication No. 2003/0128225, (U.S. Appl. No. 10/278,353).

USPTO, Non-Final Office Action, dated Nov. 16, 2004 in US Patent Publication No. 2003/0128179, (U.S. Appl. No. 10/278,352).

Clairvoyante Inc, Response to Non-Final Office Action, dated Apr. 15, 2005 in US Patent Publication No. 2003/0128179, (U.S. Appl. No. 10/278,352).

USPTO, Non-Final Office Action, dated Jul. 12, 2005 in US Patent Publication No. 2003/0128179, (U.S. Appl. No. 10/278,352).

Clairvoyante Inc, Response to Non-Final Office Action, dated Jan. 12, 2006 in US Patent Publication No. 2003/0128179, (U.S. Appl. No. 10/278,352).

USPTO, Final Office Action, dated Sep. 18, 2006 in US Patent Publication No. 2003/0128179, (U.S. Appl. No. 10/278,352).

Clairvoyante Inc, Response to Final Office Action, dated Dec. 6, 2006 in US Patent Publication No. 2003/0128179, (U.S. Appl. No. 10/278,352).

USPTO, Non-Final Office Action, dated Nov. 16, 2004 in US Patent Publication No. 2004/0196297 (U.S. Appl. No. 10/409,413).

Clairvoyante, Inc. Response to Non-Final Office Action, dated Apr. 15, 2005 in US Patent Publication No. 2004/0196297 (U.S. Appl. No. 10/409,413).

USPTO, Notice of Non-Compliant Amendment, dated Apr. 22, 2005 in US Patent Publication No. 2004/0196297 (U.S. Appl. No. 10/409,413).

Clairvoyante, Inc. Response to Notice of Non-Compliant Amendment, dated Apr. 28, 2005 in US Patent Publication No. 2004/0196297 (U.S. Appl. No. 10/409,413).

USPTO, Final Office Action, dated Jul. 22, 2005 in US Patent Publication No. 2004/0196297 (U.S. Appl. No. 10/409,413).

Clairvoyante, Inc. Response to Final Office Action, dated Jan. 20, 2006 in US Patent Publication No. 2004/0196297 (U.S. Appl. No. 10/409,413).

USPTO, Non-Final Office Action dated Jan. 23, 2006 in US Patent Publication No. 2004/0246278 (U.S. Appl. No. 10/455,927).

USPTO, Non-Final Office Action dated Jun. 13, 2005 in US Patent No. 7,176,935 (U.S. Appl. No. 10/690,716).

Clairvoyante, Inc. Response to Non-Final Office Action, dated Dec. 13, 2005 in US Patent No. 7,176,935 (U.S. Appl. No. 10/690,716).

PCT International Search Report dated Apr. 8, 2003 for PCT/US02/39864 (U.S. Appl. No. 10/278,353).

PCT International Search Report dated Apr. 9, 2003 for PCT/US02/39857 (U.S. Appl. No. 10/278,352).

PCT International Search Report dated Aug. 10, 2006 for PCT/US04/05196 (U.S. Appl. No. 10/409,413).

PCT International Search Report dated Mar. 15, 2006 for PCT/US04/18033 (U.S. Appl. No. 10/455,927).

PCT International Search Report dated Apr. 26, 2005 for PCT/US04/33743 (US Patent No. 7,176,935).

PCT International Search Report dated Jul. 29, 2008 for PCT/US08/56241 (U.S. Appl. No. 11/684,499).

PCT International Search Report dated Aug. 21, 2008 for PCT/US08/59916 (U.S. Appl. No. 11/734,275).

* cited by examiner

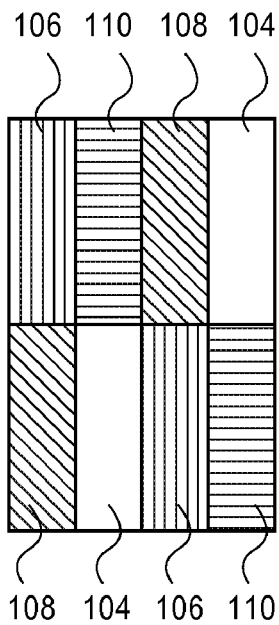 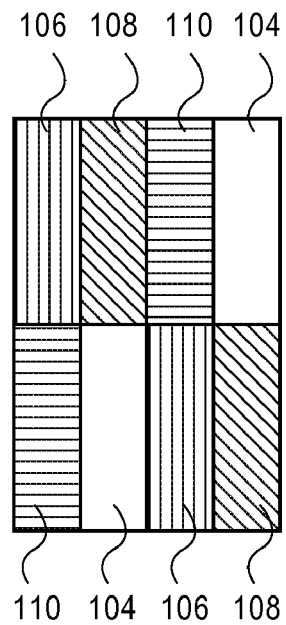
FIG. 3A  FIG. 3B
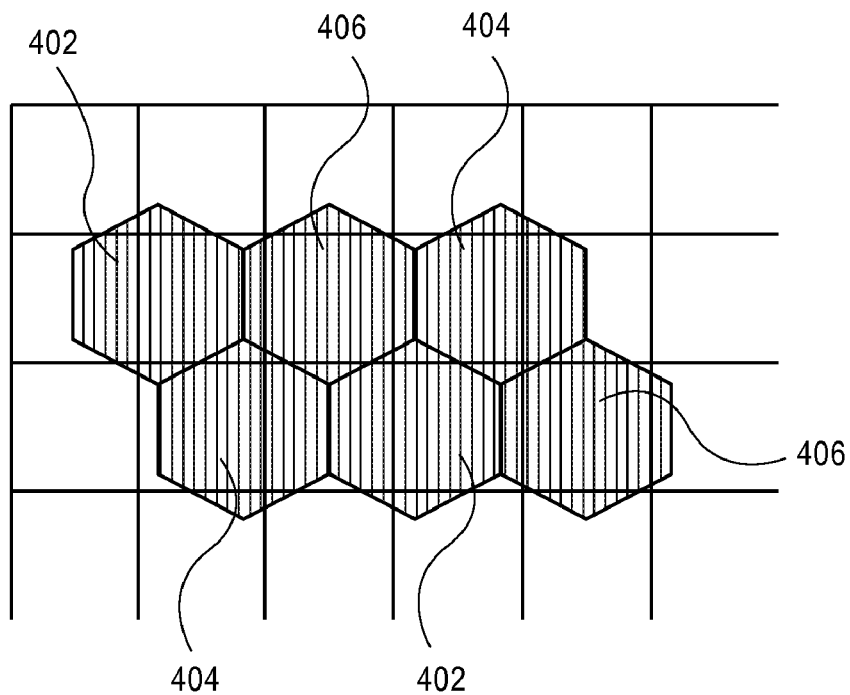
FIG. 4

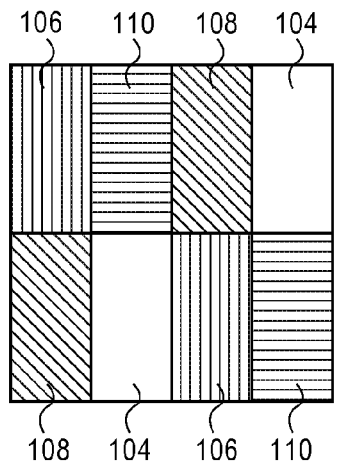 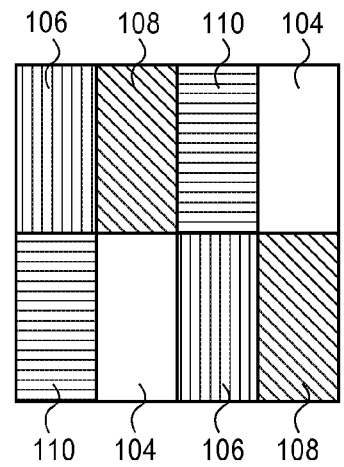
FIG. 5A  FIG. 5B
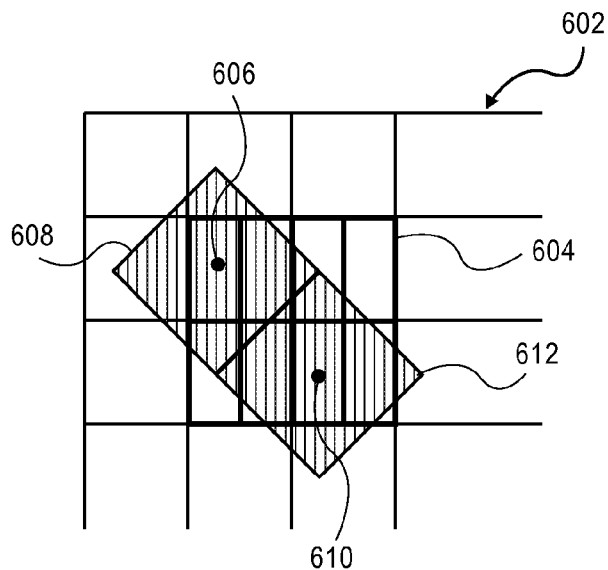
FIG. 6
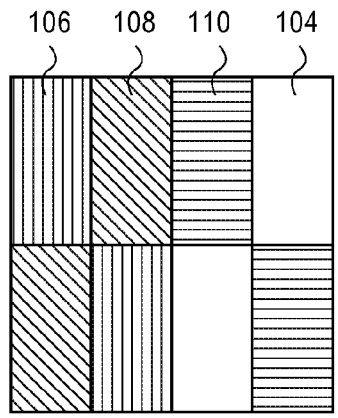
FIG. 7

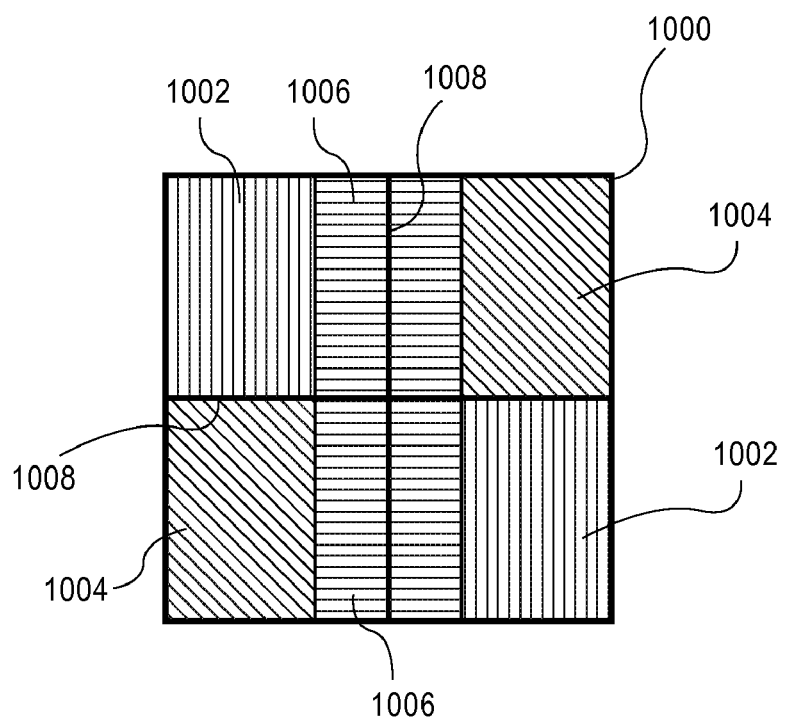
FIG. 10
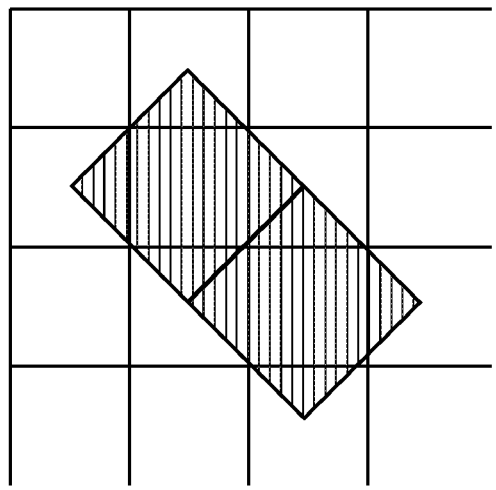 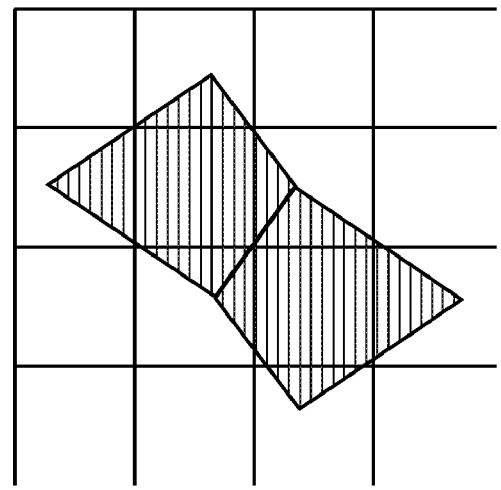
FIG. 11 FIG. 12

SUBPIXEL RENDERING FILTERS FOR HIGH BRIGHTNESS SUBPIXEL LAYOUTS

RELATED APPLICATIONS

This application is a continuation of, and claims priority to, U.S. patent application Ser. No. 10/821,388 filed on Apr. 9, 2004, and issued as U.S. Pat. No. 7,248,268. U.S. Ser. No. 10/821,388 was published as US Patent Application Publication No. 2005/0225563 which is hereby incorporated by reference herein for all that it teaches

BACKGROUND

In commonly owned United States patent applications: (1) U.S. patent application Ser. No. 09/916,232, entitled "ARRANGEMENT OF COLOR PIXELS FOR FULL COLOR IMAGING DEVICES WITH SIMPLIFIED ADDRESSING," filed Jul. 25, 2001, now issued as U.S. Pat. No. 6,903,754 ("the '754 patent"); (2) U.S. patent application Ser. No. 10/278,353, entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002, and published as US Patent Publication No. 2003/0128225 ("the '225 application"); (3) U.S. patent application Ser. No. 10/278,352, entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002 and published as US Patent Publication No. 2003/0128179 ("the '179 application"); (4) U.S. patent application Ser. No. 10/243,094, entitled "IMPROVED FOUR COLOR ARRANGEMENTS AND EMITTERS FOR SUB-PIXEL RENDERING," filed Sep. 13, 2002 and published as US Patent Publication No. 2004/0051724 ("the '724 application"); (5) U.S. patent application Ser. No. 10/278,328, entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002 and published as US Patent Publication No. 2003/0117423 ("the '423 application"); (6) U.S. patent application Ser. No. 10/278,393, entitled "COLOR DISPLAY HAVING HORIZONTAL SUB-PIXEL ARRANGEMENTS AND LAYOUTS," filed Oct. 22, 2002 and published as US Patent Publication No. 2003/0090581 ("the '581 application"); (7) U.S. patent application Ser. No. 10/347,001 entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, and published as US Patent Publication No. 2004/0080479 ("the '479 application"); each of which is herein incorporated by reference in its entirety, novel sub-pixel arrangements are disclosed for improving the cost/performance curves for image display devices.

For certain subpixel repeating groups having an even number of subpixels in a horizontal direction, the following systems and techniques to affect improvements, e.g. proper dot inversion schemes and other improvements, are disclosed and are herein incorporated by reference in their entirety: (1) U.S. patent application Ser. No. 10/456,839 entitled "IMAGE DEGRADATION CORRECTION IN NOVEL LIQUID CRYSTAL DISPLAYS" and published as US Patent Publication No. 2004/0246280 ("the '280 application"); (2) U.S. patent application Ser. No. 10/455,925 entitled "DISPLAY PANEL HAVING CROSSOVER CONNECTIONS EFFECTING DOT INVERSION" and published as US Patent Publication No. 2004/0246213 ("the '213 application"); (3) U.S. patent application Ser. No. 10/455,931 entitled "SYSTEM AND METHOD OF PERFORMING DOT INVERSION WITH STANDARD DRIVERS AND BACKPLANE ON NOVEL DISPLAY PANEL LAYOUTS" now issued as U.S. Pat. No. 7,218,301 ("the '301 patent"); (4) U.S. patent application Ser. No. 10/455,927 entitled "SYSTEM AND METHOD FOR COMPENSATING FOR VISUAL EFFECTS UPON PANELS HAVING FIXED PATTERN NOISE WITH REDUCED QUANTIZATION ERROR" now issued as U.S. Pat. No. 7,209,105 ("the '105 patent"); (5) U.S. patent application Ser. No. 10/456,806 entitled "DOT INVERSION ON NOVEL DISPLAY PANEL LAYOUTS WITH EXTRA DRIVERS" now issued as U.S. Pat. No. 7,187,353 ("the '353 patent"); (6) U.S. patent application Ser. No. 10/456,838 entitled "LIQUID CRYSTAL DISPLAY BACKPLANE LAYOUTS AND ADDRESSING FOR NON-STANDARD SUBPIXEL ARRANGEMENTS" and published as US Patent Publication No. 2004/0246404 ("the '404 application"); (7) U.S. patent application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003 and published as US Patent Publication No. 2005/0083277 ("the '277 application"); and (8) U.S. patent application Ser. No. 10/807,604 entitled "IMPROVED TRANSISTOR BACKPLANES FOR LIQUID CRYSTAL DISPLAYS COMPRISING DIFFERENT SIZED SUBPIXELS", filed Mar. 23, 2004 and published as US Patent Publication No. 2005/0212741 ("the '741 application");.

These improvements are particularly pronounced when coupled with sub-pixel rendering (SPR) systems and methods further disclosed in those applications and in commonly owned United States patent applications: (1) U.S. patent application Ser. No. 10/051,612, entitled "CONVERSION OF A SUBPIXEL FORMAT DATA TO ANOTHER SUBPIXEL DATA FORMAT," filed Jan. 16, 2002 now issued as U.S. Pat. No. 7,123,277 ("the '277 patent"); (2) U.S. patent application Ser. No. 10/150,355, entitled "METHODS AND SYSTEMS FOR SUB-PIXEL RENDERING WITH GAMMA ADJUSTMENT," filed May 17, 2002 now issued as U.S. Pat. No. 7,221,381 ("the '381 patent"); (3) U.S. patent application Ser. No. 10/215,843, entitled "METHODS AND SYSTEMS FOR SUB-PIXEL RENDERING WITH ADAPTIVE FILTERING," filed Aug. 8, 2002 now issued as U.S. Pat. No. 7,184,066 ("the '066 patent"); (4) U.S. patent application Ser. No. 10/379,767 entitled "SYSTEMS AND METHODS FOR TEMPORAL SUB-PIXEL RENDERING OF IMAGE DATA" filed Mar. 4, 2003 and published as US Patent Publication No. 2004/0196302 ("the '302 application"); (5) U.S. patent application Ser. No. 10/379,765 entitled "SYSTEMS AND METHODS FOR MOTION ADAPTIVE FILTERING," filed Mar. 4, 2003 now issued as U.S. Pat. No. 7,167,186 ("the '186 patent"); (6) U.S. patent application Ser. No. 10/379,766 entitled "SUB-PIXEL RENDERING SYSTEM AND METHOD FOR IMPROVED DISPLAY VIEWING ANGLES" filed Mar. 4, 2003 now issued as U.S. Pat. No. 6,917,368 ("the '368 patent"); (7) U.S. patent application Ser. No. 10/409,413 entitled "IMAGE DATA SET WITH EMBEDDED PRE-SUBPIXEL RENDERED IMAGE" filed Apr. 7, 2003, and published as US Patent Publication No. 2004/0196297 ("the '297 application"); which are hereby incorporated herein by reference in their entirety.

Improvements in gamut conversion and mapping are disclosed in commonly owned and co-pending United States patent applications: (1) U.S. patent application Ser. No. 10/691,200 entitled "HUE ANGLE CALCULATION SYSTEM AND METHODS", filed Oct. 21, 2003 now issued as U.S. Pat. No. 6,980,219 ("the '219 patent"); (2) U.S. patent application Ser. No. 10/691,377 entitled "METHOD AND APPARATUS FOR CONVERTING FROM SOURCE COLOR SPACE TO RGBW TARGET COLOR SPACE", filed Oct. 21, 2003 and published as US Patent Publication No. 2005/0083341 ("the '341 application"); (3) U.S. patent application Ser. No. 10/691,396 entitled "METHOD AND APPARATUS FOR CONVERTING FROM A SOURCE COLOR SPACE TO A TARGET COLOR SPACE", filed Oct. 21, 2003 and published as US Patent Publication No. 2005/0083352 ("the '352 application") and (4) U.S. patent application Ser. No. 10/690,716 entitled "GAMUT CONVERSION SYSTEM AND METHODS" filed Oct. 21, 2003 now issued as U.S. Pat. No. 7,176,935 ("the '935 patent"); which are all hereby incorporated herein by reference in their entirety.

Additional advantages have been described in (1) U.S. patent application Ser. No. 10/696,235 entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003, now issued as U.S. Pat. No. 7,084,923 ("the '923 patent"); and (2) U.S. patent application Ser. No. 10/696,026 entitled "SYSTEM AND METHOD FOR PERFORMING IMAGE RECONSTRUCTION AND SUBPIXEL RENDERING TO EFFECT SCALING FOR MULTI-MODE DISPLAY" filed Oct. 28, 2003 and published as US Patent Publication No. 2005/0088385 ("the '385 application").

Additionally, these co-owned and co-pending applications are herein incorporated by reference in their entirety: (1) U.S. patent application Ser. No. 10/821,387 entitled "SYSTEM AND METHOD FOR IMPROVING SUB-PIXEL RENDERING OF IMAGE DATA IN NON-STRIPED DISPLAY SYSTEMS" and published as US Patent Publication No. 2005/0225548 ("the '548 application"); (2) U.S. patent application Ser. No. 10/821,386 entitled "SYSTEMS AND METHODS FOR SELECTING A WHITE POINT FOR IMAGE DISPLAYS" and published as US Patent Publication No. 2005/0225561 ("the '561 application"); (3) U.S. patent application Ser. No. 10/821,353 entitled "NOVEL SUB-PIXEL LAYOUTS AND ARRANGEMENTS FOR HIGH BRIGHTNESS DISPLAYS" and published as US Patent Publication No. 2005/0225574 ("the '574 application"); (4) U.S. patent application Ser. No. 10/821,306 entitled "SYSTEMS AND METHODS FOR IMPROVED GAMUT MAPPING FROM ONE IMAGE DATA SET TO ANOTHER" and published as US Patent Publication No. 2005/0225562 ("the '562 application"); which are all hereby incorporated by reference. All patent applications mentioned in this specification are hereby incorporated by reference in their entirety.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIGS. 1 through 3B are embodiments of high brightness layouts for displays of all types as made in accordance with the principles of the present invention.

FIG. 4 is one exemplary embodiment of a resampling of one of the color planes for one of the above high brightness layouts.

FIGS. 5A and 5B are yet other embodiments of a high brightness layout for displays as made in accordance with the principles of the present invention.

FIG. 6 is one exemplary embodiment of a resampling of one of the color planes for the layout as shown in FIG. 5.

FIGS. 7 and 8 are yet other embodiments of high brightness layouts for displays as made in accordance with the principles of the present invention.

FIG. 10 is one example of a reconstruction grid being superimposed onto a target 3-color subpixel layout.

FIGS. 11 through 14C are examples of various resample areas depending on the relative positioning of input image data grid to target subpixel layout.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Subpixel Rendering for Five Color Systems w/White

Figure 1:
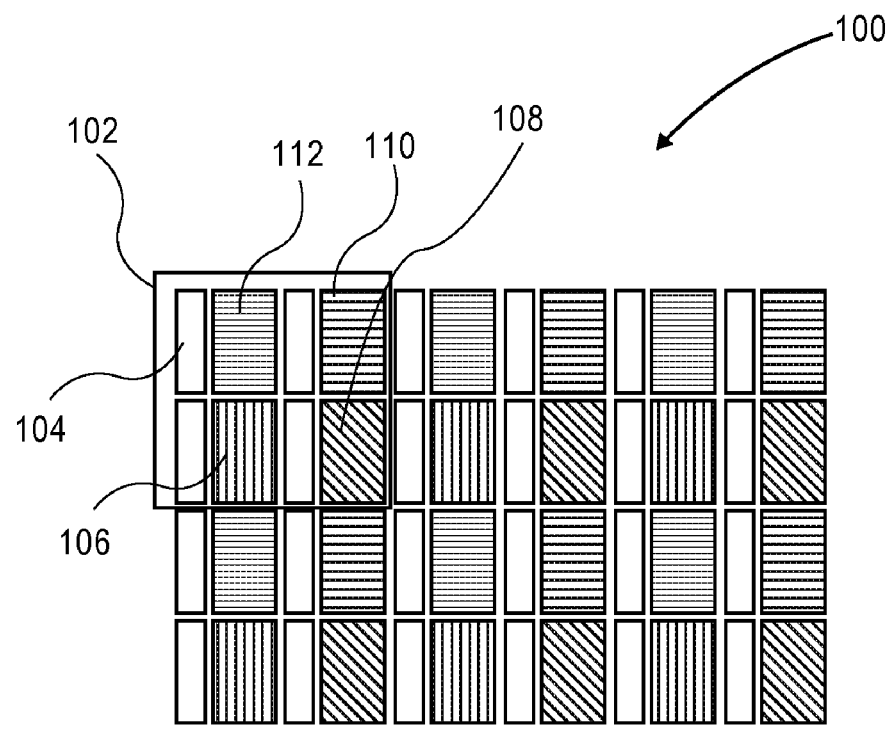

FIG. 1 shows one embodiment of a portion of a high-brightness, multiprimary display 100 substantially comprising a subpixel repeating group 102 as shown. Group 102 is an octal subpixel repeating group comprising white (or no color filter) subpixels 104, red subpixels 106, green subpixel 108, blue subpixels 110 and cyan subpixels 112. The white subpixel is added to help achieve the high brightness performance of the display. Additionally, as the white subpixels are good candidates for being centers of luminance for subpixel rendering (SPR)—the white, as the majority subpixel, gives high MTF Limit performance. In this embodiment, there are equal numbers of red, green, cyan, and blue subpixels—of course, other embodiments may deviate some from this color partitioning. Given that the white subpixel is adding brightness to the system and that the use of the cyan color is to give a wider color gamut, it may be advantageous to set the color points of the minority subpixels to be deeply saturated to result in a wide color gamut. It should be noted that these color points and energies are only "substantially" the colors described as "red", "green", "blue", "cyan", and "white". The exact color points may be adjusted to allow for a desired white point when all of the subpixels are at their brightest state.

Figure 2:
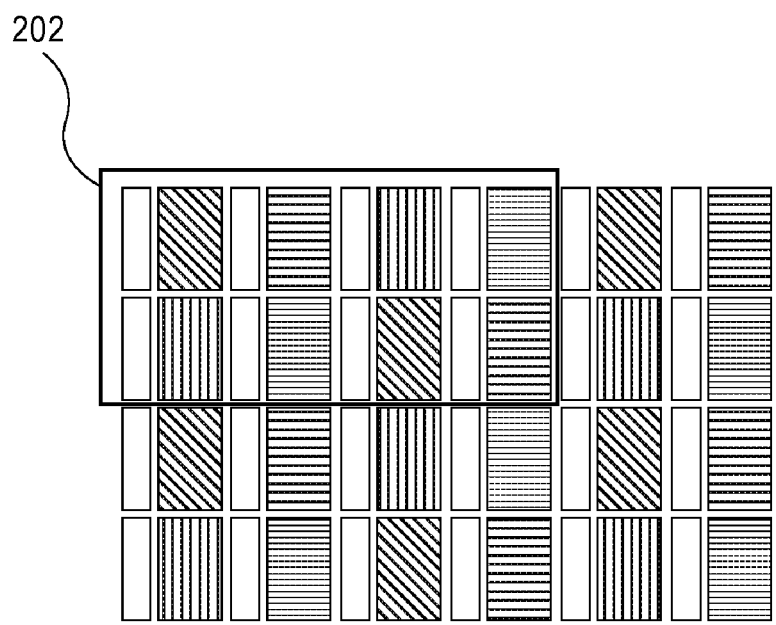

FIG. 2 shows a portion of another embodiment of a high brightness, 5-color display. Here, the subpixel repeating group is group 202—which is larger than the one shown in FIG. 1 because the color subpixels are placed on a hexagonal grid. One possible advantage of a hexagonal grid is that it tends to scatter the Fourier energies in more directions and points. This may be especially useful for the dark luminance wells caused by the blue subpixels. Another possible advantage is that each row contains all four colors as well as the white subpixels, allowing for horizontal lines to be black and white, fully sharpened, without chromatic aliasing.

One possible embodiment of a display system using this layout may process image data and render it as follows:
(1) Convert conventional data (e.g. RGB, sRGB, YCbCr, or the like) to RGBCW+L image data, if needed;
(2) Subpixel render each individual color plane;
(3) Use the "L" (or "Luminance") plane to sharpen each color plane.

The subpixel rendering filter kernels may be constructed from area resampling theory, as disclosed earlier in many incorporated applications noted above. Both layouts may be subpixel rendered from data sets that have a one-to-one mapping. That is to say, one incoming conventional pixel maps to one white subpixel. The white subpixels may then fully reconstruct the bulk of the non-saturated luminance signal of the image. The surrounding colored subpixels then operate to provide the color signal. The incoming image may be any format of color signal, as long as color gamut mapping with or without gamut expansion, may operate to convert said format to RGBCW expected by the subpixel rendering engine. It will be appreciated that such area resampling filters may be replaced by other suitable subpixel rendering techniques: resampling using bicubic filter, sinc filters, windowed-sinc filter and any convolutions thereof. It will be further appreciated that the scope of the present invention encompasses the use of these other techniques.

As the white subpixels are mapped one to one, they may use a unity filter with no further processing required. The color planes may be filtered using several possible kernels. For example, assuming that the image is band-limited, one embodiment might shift the phase of each of the color planes and the Luminance plane to the interstitial positions of the color subpixels in the horizontal direction. This may be accomplished with a simple cubic interpolation filter: $-1/16$, $9/16$, $9/16$, $-1/16$. It should be note that the white plane may not need to be shifted. For non-band-limited images (e.g. text or sharp edges in images), there may not need to be the cubic filtered phase shift as above.

Then, the color planes may be filtered with an area resample filter. A Difference of Gaussian (DOG) filter applied to luminance may optionally be added, examples are given here:

```
1  2  1
2  4  2
1  2  1   (Divide by 16)
```

Area Resample Filter for hexagonal and square arrangement

```
 0   0  -2   0   0
-1   0   0   0  -1
 0   0   8   0   0
-1   0   0   0  -1
 0   0  -2   0   0   (Divide by 16)
```

DOG Filter for hexagonal arrangement of FIG. 2.

It should be noted that non-zero values coincide with the same color to keep the color balanced. Using the luminance signal implements a simplified "cross-color" sharpening.

In another embodiment, one could also perform actual cross-color sharpening, distributing the values of the cross-color coefficients among the color filter kernels such that the matrices add up to the desired numbers such as above. One method that may be useful is to divide the values of the actual subpixel luminances—red, green, blue, and cyan—by the luminance value of the color that is being sharpened, and then multiply the result by the matrix above times a suitable normalization constant such that it adds up to the matrix above. Another way might be to not perform the normalization, which would mean that some colors would experience greater than unity gain sharpening. The colors that experienced the greatest gain would be the colors with the lowest luminance. This last property may be useful to reduce the "dottiness" of the high spatial frequency detail, increasing the quality of the signal. These methods and techniques of using varying sharpening gain on the colors may also be driven by the luminance signal as above.

In one embodiment, multiplying the values of the sharpening matrix by a constant allows adjustment of the gain of the system. For this embodiment, if the constant is less than one, the filter is softer; if the constant is greater than one, the filter is sharper. Of course, other embodiments are contemplated by the present invention with different matrices and constants.

It should also be noted that the one possible method uses the simplest subpixel rendering filter kernels—with the math being performed substantially by bit shift division and addition. Other methods and embodiments may give numbers that require more multi-bit precision multipliers. Of course, performing the color gamut mapping may require such multipliers as well.

As well as cross-color sharpening, one embodiment of the system may be implemented using self-sharpening by adding the two matrices together. For example, the following may be useful for the arrangement of FIG. 2:

```
 0   0  -2   0   0
-1   1   2   1  -1
 0   2  12   2   0
-1   1   2   0   0
 0   0  -2   0   0   Divide by 16
```

Since the mapping of the conventional pixel data, in whatever form it comes in, to the multi-primary space is indeterminate, this may introduce a degree of freedom that could be advantageous. For example, choosing any given algorithm may always give the right color over all; but may not give the best visual result. For example, the color subpixels, not all having the same luminance, may introduce a spurious pattern for many non-optimal mappings. The desired color mapping would give the most even texture for patches of a given color, minimizing visible spatial frequencies of luminance modulation, over the broadest range of colors; hue, saturation, and brightness. Such a mapping would allow the fine details to be displayed using the algorithm disclosed above. In another embodiment, the system might work with a plurality of transform matrices, if no single transform matrix provides optimal result for all colors. It may be advantageous to create domains, or even continuously variable transforms.

Rendering Novel RGBW Panels

In many cases, novel RGBW panels (and 5-, 6-, n-color panels, for that matter) will be called upon to render legacy RGB or other 3-color image data. In many applications incorporated by reference above, there are described various embodiments for subpixel rendering resampling a modified conventional image data set. The modification is that each and every incoming conventional pixel has four (or more)—instead of three—color component values; e.g. Red, Green, Blue, and "White". The "White" in quotes denotes that this color point may or may not be at the white point of the display when all color subpixels are set to their maximum values. It may be desirable that any Gamut Mapping Algorithm (GMA) conversion from RGB to RGBW (or other multiprimary color space) occur before the subpixel rendering to keep the image from being blurred. The filter set could be designed to produce good results for both text and photographs. For example, in the '724 application incorporated by reference, there are shown some novel RGBW and RGBC layouts. For these layouts, one embodiment of the filters for the SPR for layouts that have a red/green checkerboard may be the following:

Red and Green use:

$$\begin{matrix} -.0625 & 0 & -.0625 \\ 0 & .25 & 0 \\ -.625 & 0 & -.0625 \end{matrix} + \begin{matrix} 0 & .125 & 0 \\ 1.25 & .5 & .125 \\ 0 & .125 & 0 \end{matrix} = \begin{matrix} -.0625 & .125 & .0625 \\ .125 & .75 & .125 \\ -.0625 & .125 & .0625 \end{matrix}$$

$$\text{DOG Wavelet} + \text{Area Resample} = \text{Cross-Color Sharpening Kernel}$$

The Red and Green color planes are area resampled to remove any spatial frequencies that will cause chromatic aliasing. The DOG wavelet is used to sharpen the image using the cross-color component. That is to say, the red color plane is used to sharpen the green subpixel image and the green color plane is used to sharpen the red subpixel image. This allows the cross-color luminance signal to be impressed onto the color subpixels, 'filling in the holes' in color images. It should be noted that for monochromatic images, the results of cross-color DOG wavelet sharpening is the same as self-color sharpening. It should also be noted that the coefficients disclosed above are exemplary of one particular embodiment and that the present invention contemplates many other matrices having suitable coefficients that suffice.

The Blue color plane may be resampled using one of a plurality of filters. For example, blue could be resampled with a simple 2×2 box filter:

$$\begin{matrix} .25 & .25 \\ .25 & .25 \end{matrix}$$

Alternatively, the Blue color plane could be resampled using a box-tent filter centered on the blue subpixel:

$$\begin{matrix} .125 & .25 & .125 \\ .125 & .25 & .125 \end{matrix}$$

Moreover, the white plane could also be filtered using one of a plurality of filters. For example, the white or cyan color plane could be resampled using a non-axis-separable 4×4 box-cubic filter:

$$\begin{matrix} & -1/32 & -1/32 & \\ -1/32 & 10/32 & 10/32 & -1/32 \\ -1/32 & 10/32 & 10/32 & -1/32 \\ & -1/32 & -1/32 & \end{matrix}$$

Alternatively, to help abate that there is no phase error, nor aliasing, on the white or cyan subpixel, an axis-separable 3×4 tent-cubic filter might be used:

$$\begin{matrix} -1/64 & -1/32 & -1/64 \\ 9/64 & 9/32 & 9/64 \\ 9/64 & 9/32 & 9/64 \\ -1/64 & -1/32 & -1/64 \end{matrix}$$

The use of the box-cubic and tent-cubic filters may help to reduce the moiré artifacts in photographs while maintaining sharpness in text by taking advantage of the mid-position of the white subpixels. Although not necessary, it is possible to use the same filters for both blue and white color planes. One could use either the plain box or tent for both, or the box-cubic or tent-cubic for both. Alternatively, the cubic filters should be chosen for both.

FIGS. 3A and 3B show embodiments of a high brightness display having the repeating subpixel groupings as shown. Although these layouts may have any aspect ratio possible, FIGS. 3A and 3B depicts this layout with all subpixels having a 1:3 aspect ratio. That produces subpixels that are taller and thinner than a possible square outline or 2:3 aspect ratio. This layout comprises a combination where the blue sub-pixels have the same size as the red and green and the same number—which results in a substantially color-balanced RGBW layout, since there is the same area coverage of the red, green, and blue emitters using the same filters as would be found in conventional RGB display panels.

The layouts of FIGS. 3A and 3B have a potential advantage in that it may be manufactured on a standard RGB stripe backplane with a suitable change in the color filter. One embodiment of a panel having one of these layouts may use any suitable form of SPR algorithm, as discussed herein or in applications incorporated by reference.

In one embodiment, the image source data to the display might assume a square aspect ratio—thus, with no scaling, each input pixel would map to three sub-pixels in this layout. However, these RGBW 1:3 layouts are 4 sub-pixels wide per repeat cell. If source pixels are mapped to groups of three such sub-pixels, then three of the layouts tiled horizontally might suffice before all the possible combinations are found. For each different combination of three output sub-pixels grouped like this, a different set of area resample filters might suffice. This is similar to the process of finding a repeat cell and generating different sets of filters for scaling, as disclosed in applications incorporated above.

In fact, the same logic that does scaling might be used to select suitable filters. In one embodiment, there could be a simplification that may be easier to implement than scaling. As in scaling, there may be symmetries that reduce the total number of filters, and in this case, there are only three filters that are used over and over again in different combinations of colors. FIG. 4 depicts the resample areas and filters so generated for the red subpixels. The filters for green, blue and white are identical, but appear in a different order or orientation.

As may be seen in FIG. 4, the resample areas may be hexagons with three different alignments: offset ⅓ to the left (as seen as areas 404), centered (as seen as areas 406), or offset ⅓ to the right (as seen as area 402). The three resulting unique area resampling filters are:

| Area Resample Filters | | | | | | | | |
|---|---|---|---|---|---|---|---|---|
| 2 | 12 | 0 | 0 | 14 | 0 | 0 | 2 | 12 |
| 82 | 146 | 0 | 22 | 184 | 22 | 0 | 146 | 82 |
| 2 | 12 | 0 | 0 | 14 | 0 | 0 | 2 | 12 |

The resulting images may have a slightly blurred appearance, and thus, it may be possible to apply cross-luminosity sharpening filters to substantially correct this:

| Cross Luminosity Filters | | | | | | | | |
|---|---|---|---|---|---|---|---|---|
| −8 | −8 | 0 | −8 | 0 | −8 | 0 | −8 | −8 |
| 0 | 32 | 0 | 0 | 32 | 0 | 0 | 32 | 0 |
| −8 | −8 | 0 | −8 | 0 | −8 | 0 | −8 | −8 |

It will be appreciated that these cross-luminosity filters are distinguishable from cross-color sharpening filters. One possible advantage of cross-luminosity filtering is that blue and white can be sharpened, as well as red and green (as before with cross-color) with a single value, thus reducing the number of operations. In a low cost RGBW implementation, these luminosity values may be calculated using any of the embodiments disclosed in several applications incorporated herein. One example uses the formula:

$$Y=(2*R+4*G+G+B)/8.$$

It should be noted that this luminosity value can be calculated by performing only shifts and adds in hardware or software.

In one embodiment, the color values may be sampled using the area resample filters above, the luminosity "plane" may be sampled using the cross-luminosity filters, and the two results are added together. This can occasionally produce values below zero or above the maximum, so the results may be clamped to the allowed range.

The area resampling filters above correct for the offset position of the sub-pixel within the source pixel with coefficients that sample a little more of the color to one side or the other. An alternative way to accomplish this may be to use a horizontal cubic filter to change the phase of the input data. When an output sub-pixel lands in the center of an input pixel, no phase adjustment is necessary and the centered area resample filter can be used. When the output sub-pixel lands in an offset position in an input pixel, one of the following two cubic filters may be used to generate a "psuedo-sample" that is aligned with the center of the output sub-pixel:

| Horizontal Cubic Filters | | | | | | | |
|---|---|---|---|---|---|---|---|
| −9 | 84 | 199 | −18 | −18 | 199 | 84 | −9 |

Once the phase is aligned, the centered area resample filter and sharpening filter may be used for all output sub-pixels. In one exemplary hardware implementation, these cubic filters may be implemented using special purpose logic to do the multiplies by fixed numbers. This calculation could be done on input values before passing them to the sub-pixel rendering logic. The sub-pixel rendering logic may thus be simplified, at the cost of the pre-conditioning of the data with the cubic filter. In one exemplary software implementation, it might be advantageous to convolve the cubic filters with the centered area resample filter. This results in two filter kernels shown below:

| Cubic plus Area Resampling Filters | | | | | | | | | | | |
|---|---|---|---|---|---|---|---|---|---|---|---|
| 0 | 0 | 4 | 11 | −1 | 0 | 0 | −1 | 11 | 4 | 0 | 0 |
| −1 | 1 | 77 | 149 | 4 | −2 | −2 | 4 | 149 | 77 | 1 | −1 |
| 0 | 0 | 4 | 11 | −1 | 0 | 0 | −1 | 11 | 4 | 0 | 0 |

These two filters can be substituted for the offset filters in the first area resampling case to simulate the cubic case with no other changes to the software. When these filters are used, the luminosity plane may also be phase aligned which might employ convolving the centered sharpening filter with the two horizontal cubic filters:

| Cubic plus Sharpening Filters | | | | | | | | | |
|---|---|---|---|---|---|---|---|---|---|
| 1 | −6 | −2 | −6 | −3 | −3 | −6 | −2 | −6 | 1 |
| 0 | −2 | 25 | 11 | −2 | −2 | 11 | 25 | −2 | 0 |
| 1 | −6 | −2 | −6 | −3 | −3 | −6 | −2 | −6 | 1 |

As the layouts of FIGS. 3A and 3B are similar to the conventional RGB stripe layout, one low cost system might proceed by copying or assigning the nearest RGB or W value into the output sub-pixel without performing area resampling. However, undesirable color error might occur. The horizontal component of this error may be reduced by using the horizontal cubic filters above. As this system would require no line buffers, low hardware costs reduce the overall cost of the system. Additionally, as the cubic filters have a slight sharpening effect, separate sharpening may not be not needed. The horizontal lines of fonts may look reasonably good, however the vertical components of fonts may still exhibit color error. Such a low cost system might be acceptable in an image-only application, such as a camera viewfinder.

FIGS. 5A and 5B are yet other embodiments of a high brightness RGBW layout—but have a 1:2 aspect ratio for their subpixels. This subpixel repeating group comprising blue sub-pixels the same size as the red and green and adding two white subpixels tends to result in a color-balanced RGBW layout. It will be appreciated that the layouts of FIGS. 3A, 3B, 5A, and 5B—while placing the red and green sub-pixels and the blue and white subpixels, or red and blue subpixels and the green and white subpixels, on a checkerboard pattern—may be viewed as having other patterns alternatively. For example, any mirror image or rotation or other symmetries are contemplated. Additionally, the subpixels need not be placed on a fully intertwined checkerboard for the purposes of the present invention, an example of which is given in FIG. 7.

In one embodiment, each input pixel image data may be mapped to two sub-pixels. In effecting this, there are still a number of different ways to align the input pixels and generate the area resampling filters. The first considered was to simply align 4 input pixels directly with the layouts shown in FIGS. 5A and 5B. FIG. 6 shows one example of an area resampling of the red color plane as described. Input pixel image data is depicted on grid 602 and the repeating group 604 of subpixels of FIG. 5A is superimposed upon the grid. Red subpixels 606 and 610 and their associated "diamond" filters 608 and 612 are also shown. Area resampling may then occur in the manner described herein and in many applications incorporated herein, an example is given here:

| −.0625 | 0 | −.0625 |   | 0 | .125 | 0 |   | −.0625 | .125 | −.0625 |
|---|---|---|---|---|---|---|---|---|---|---|
| 0 | .25 | 0 | + | .125 | .5 | .125 | = | .125 | .75 | .125 |
| −.0625 | 0 | −.0625 |   | 0 | .125 | 0 |   | −.0625 | .125 | −.0625 |
| *DOG* Wavelet | | | + | Area Resample | | | = | Luminance Sharpening Kernel | | |

For non-band-limited images, such as text, computer aided drafting (CAD), line art, or other computer generated images, it may be advantageous to treat pairs of subpixels as though they were substantially coincident, using the substantially exact same filter kernel to resample the image. This will result in sharp verticals and horizontal lines being reconstructed.

Alternatively, these diamond filters may be offset by ¼ of an input pixel. For a panel with the arrangement of FIG. 5A, the filter kernels, shown below, may be substantially the same for red and green; while blue and white use filters may be offset in the opposite direction horizontally.

| Red/green | | | | Blue/white | |
|---|---|---|---|---|---|
| 4 | 28 | 0 | 0 | 28 | 4 |
| 64 | 120 | 8 | 8 | 120 | 64 |
| 4 | 28 | 0 | 0 | 28 | 4 |

Another embodiment might offset the input pixels until their center points are aligned with the centers of some of the repeating sub-pixels. One example of filters that may suffice are as follows:

| Red/green (or blue/white) | | | Blue/white (or red/green, respectively) | | |
|---|---|---|---|---|---|
| 0 | 32 | 0 | 16 | | 16 |
| 32 | 128 | 32 | 96 | | 96 |
| 0 | 32 | 0 | 16 | | 16 |

One of these is the "diamond" filter while the other is split down the middle. This split may results in a blurring of the information in two of the primaries. In one embodiments, by assuming the input pixels are offset ¼ pixel to the left, the red and green sub-pixels become perfectly aligned while the white and blue sub-pixels use the split filter. In another embodiment, it may be possible to align the pixels with the highest luminosity, so if the input pixels are assumed to be offset ¼ pixel to the right then the white and blue sub-pixels are aligned while the red and green sub-pixels are split across an input pixel. The assignment of the above filters would be modified for a panel based on the arrangement of FIG. 5B, as would be obvious from this teaching to one skilled in the art.

This split may be further processed by using a cubic filter to move the phase of the input data for the split sub-pixels until they are also centered. This may be accomplished by using the following cubic filter to do this ½ pixel offset:

| One-Half (½) input pixel cubic offset filter | | | |
|---|---|---|---|
| −16 | 144 | 144 | −16 |

This offset filter may be easy to implement as shifts and adds in hardware or software. The input pixels are assumed to be shifted ¼ pixel one direction for half of the output sub-pixels and they may be rendered with the diamond filter. The other 4 sub pixels may have their input shifted with the above cubic filter then they may also be rendered with the diamond filter.

In hardware, it is easy to implement the above cubic shift on the input data as it flows through the SPR controller. In software, it is often more convenient to convolve the cubic filter with the diamond filter and perform a single filtering operation on the input for the non-aligned sub-pixels. In this case, the following combined filter kernel is used:

| 0 | −2 | 18 | 18 | −2 | 0 |
|---|---|---|---|---|---|
| −2 | 10 | 88 | 88 | 10 | −2 |
| 0 | −2 | 18 | 18 | −2 | 0 |

For the cases when the sub-pixels are aligned or brought into alignment with cubic filters, the standard cross-color or cross-luminosity sharpening filter may be used. If, however, the input pixels remain centered around pairs of output sub-pixels, then it is possible to use the following cross-luminosity filters for sharpening:

| −28 | 0 | −4 | −4 | 0 | −28 |
|---|---|---|---|---|---|
| 0 | 72 | 0 | 0 | 72 | 0 |
| −28 | 0 | −4 | −4 | 0 | −28 |

FIG. 7 is yet another embodiment of the novel high brightness layouts made in accordance with the principles of the present invention. It may be seen that the red and green—as well as the blue and white—subpixels are created on a checkerboard pattern. It will be appreciated that the similar filters as described above may be used on this alternative, although they may be used in a different order or slightly different filter kernels than the other layouts.

Figure 8:
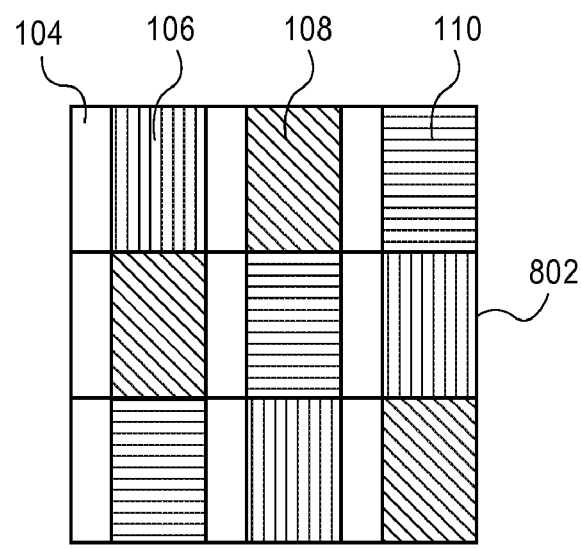

FIG. 8 is yet another embodiment of a high brightness color filter arrangement as made in accordance with the principles of the present invention. In FIG. 8, the subpixels are shown (in grid 802) having its colored subpixels with a 2:3 aspect ratio but white sub-pixels with an aspect ratio of 1:3. In this embodiment, arranging three rows of three color pixels in a mosaic or diagonal stripe arrangement, the layout becomes color balanced. It should be noted that, with a narrow white subpixel next to each color sub-pixel, each logical pixel has a bright luminosity center. In one embodiment, the input pixels may be centered on these white sub-pixels, so the white value may be simply sampled at each input location. All the color sub-pixels may be split in this alignment, but due to the diagonal stripe layout, the area resampling filter may be a tilted hexagon as in FIG. 9.

Figure 9:
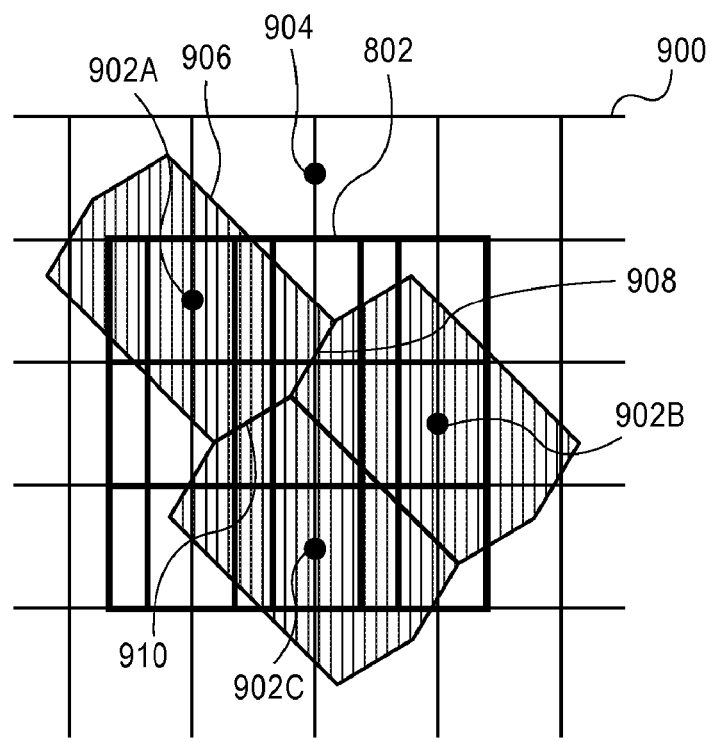
FIG. 9 is one exemplary embodiment of a resampling of one of the color planes for the layout as shown in FIG. 8.

Looking at FIG. 9, input image data grid 900 is shown. Superimposed on grid 900 is target subpixel grid 802. Centers of red subpixels and their associated resample areas (centered around dots 902a, 902b, and 902c) are also shown. In one embodiment, the hexagonal resample areas may be calculated by considering the surrounding red subpixel centers and drawing even boundaries lines between the centers. For example, red center 902a and its associated resample area has a boundary line 906 which substantially bisects the line between center 902 and red center 904. Similarly, lines 908 and 910 substantially bisect the lines between center 902a and 902b and 902c respectively. It will be appreciated that other resample area shapes may be formed in other manners for other embodiments. It suffices that the resample areas are substantially correlated with input image data in a spatial manner. It will also be appreciated that the green color plane—or any other color plane—may be treated similarly.

The resulting filter kernels may be identical for every sub-pixel of every color and could be a 4×3 filter. However, when converted to 8 bit integers, the small areas on the right and left became very small and may be discarded, resulting in the following exemplary filter:

| 40 | 12 |
|----|----|
| 76 | 76 |
| 12 | 40 |

Alternatively, the ½ pixel cubic offset filter may be used to adjust the phase of the input pixels until the psuedo-samples land on the centers of the output sub-pixels again. In this case, the area resample filters may become a 3×3 filters, as given below. Once centered like this, it is possible to use a cross-luminosity sharpening filter for this alignment, as given below.

| Area Resampling | | | Cross-Luminance Sharpening | | |
|----|----|----|----|----|----|
| 16 | 35 | 0 | −16 | 0 | 0 |
| 35 | 84 | 35 | 0 | 0 | −35 |
| 0 | 35 | 16 | 0 | 102 | 0 |
| | | | −35 | 0 | 0 |
| | | | 0 | 0 | −16 |

As with the other layouts disclosed herein, the cubic interpolation accomplishing the ½ pixel alignment may be done on a scan-line basis and may be done to the input data as it arrives. However, in software implementations, it may be convenient to convolve the cubic filter with the above two filters to do each sample in a single step. In this case, the combined cubic and area resampling filter is given below on the left with the combined cubic and sharpening filter on the right:

| −1 | 7 | 29 | 19 | −2 | 0 | 1 | −9 | −9 | 1 | 0 | 0 |
|----|----|----|----|----|----|----|----|----|----|----|----|
| −2 | 14 | 64 | 64 | 14 | −2 | 0 | 0 | 2 | −20 | −20 | 2 |
| 0 | −2 | 19 | 29 | 7 | −1 | 0 | −6 | 58 | 58 | −6 | 0 |
| | | | | | | 2 | −20 | −20 | 2 | 0 | 0 |
| | | | | | | 0 | 0 | 1 | −9 | −9 | 1 |

In another embodiment, the layout of FIG. 8 may use a cubic area resampling filter above, but may use a non-cubic cross-luminosity filter. This filter may be desirable for images with sharp edges such as text.

Sub-Pixel Rendering Filters and Offset Assumptions

Apart from use on high brightness layouts, the techniques of performing image data offsets to achieve advantageous filter kernels is also applicable to the full range of other subpixel layouts (e.g. 3-color, 4-color, 5-color, etc.) disclosed herein and in the applications incorporated by reference. The technique of area resampling may be thought, in one sense, in a geometric model for calculating the filter kernels. A picture of a target layout may be typically drawn on top of a grid of source RGB pixels. A center point, called a resample point, may be chosen for each of the sub-pixels in the target layout. Shapes, called resample areas, may be drawn which enclose substantially all of the area that lies closer to one resample point than any other resample point of the same color.

FIG. 10 depicts a three-color subpixel repeating pattern 1000 that substantially comprises red 1002, green 1004 and blue 1006 subpixels of approximately the same size. Grid lines 1008 depict an overlay of source input image data that should be remapped to the target subpixel layout. As may be seen, the input image data grid seems to split the blue sub-pixels in some ratio (e.g. one half). In the case of the layout of FIG. 10, these blue resample areas are simple rectangles. The resample points for red and green were chosen to make the resample areas turn out to be diamonds, or squares rotated 45 degrees as shown in FIG. 11. In both squares and diamonds, the shapes of the resample areas were simple enough that the intersection of the areas of the source pixels and the resample areas could be calculated analytically or geometrically.

These choices for red and green resample points are in some sense a simplification, done to make the resample areas easier to calculate and the resulting filters less expensive to implement in hardware. In these filter designs, the resample points of the red and green sub pixels were not placed at the centers of the sub-pixels, but were moved slightly left or right to make them align with the centers of the source pixels or logical pixels, as seen in FIG. 11. If these resample points are placed substantially at the center of each target sub-pixel, then the resample areas become more complicated asymmetrical diamond-like shapes, as seen FIG. 12. These shapes sometimes resemble kites flying sideways—so the resulting filters are termed "kite filters". These new shapes may be more difficult to calculate geometrically and they may change with every variation of any given subpixel layout. In some cases, it may be advantageous to leave the resample points substantially on the center of the subpixels. For example, this may reduce color error in some images. In other cases, it may be advantageous to move the resample points substantially to the center of the resample area. For example, this may simplify the filters and make implementing them in hardware less expensive.

New Filter Generation:

One embodiment of generating resample areas and their filter kernels will now be described:

(1) A first step is to accept a list of resample points and create a picture or other representation in a bitmap file.

(2) Each pixel in this image is substantially compared against all the resample points to find out which resample point is closest. In doing this, it may be desirable to consider all neighboring resample points above, below, left, right as well as in all four diagonal direction.

(3) A second pass through the bitmap image may be taken and the count of the number of pixels that are tagged as closest to one resample point may be an approximation of the resample area for that resample point. The number of tagged pixels inside each source pixel square may also be counted.

(4) The ratio of these two numbers may be an approximation of the coefficient for the filter kernel for each source pixel.

The bitmap image can be displayed or printed out to see what the resulting shape looks like and to verify that the shapes make sense.

It will be appreciated that other methods and steps may be taken to generate filter kernels for the mapping of input image data to a target subpixel layouts. It suffices for the purposes of the present invention that the filter kernels extract out image data that is substantially correlated to the target subpixels in a spatial manner.

Figure 13C:
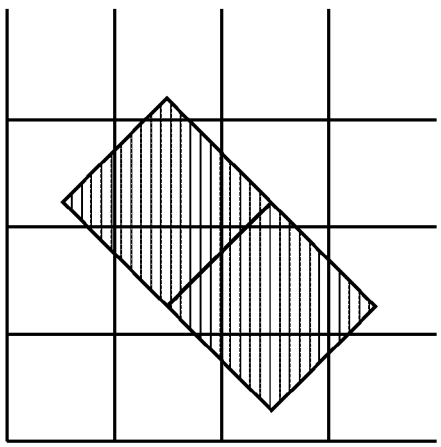
Figure 14C:
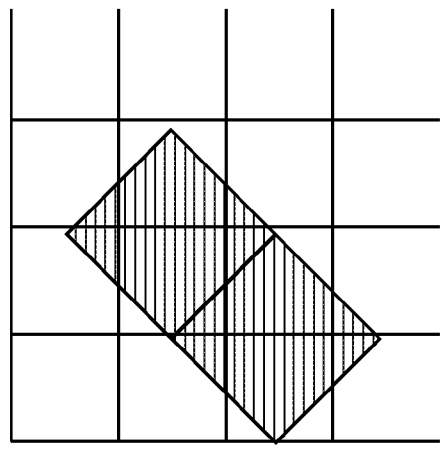
Figure 13B:
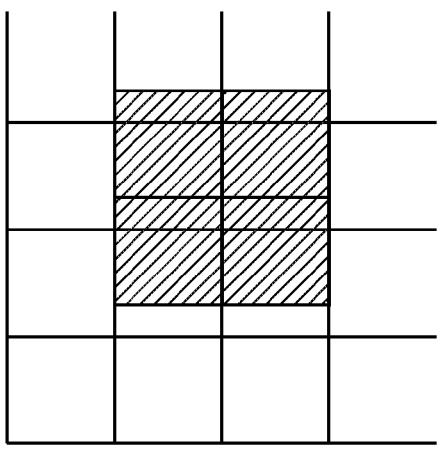
Figure 14B:
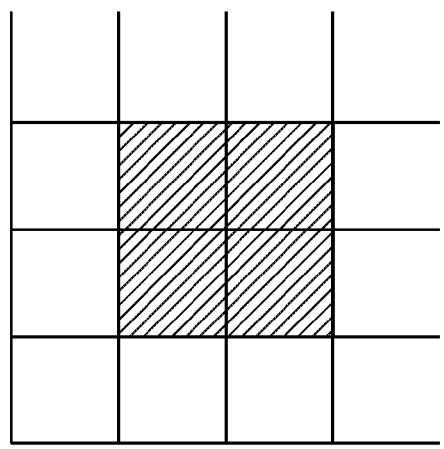
Figure 13A:
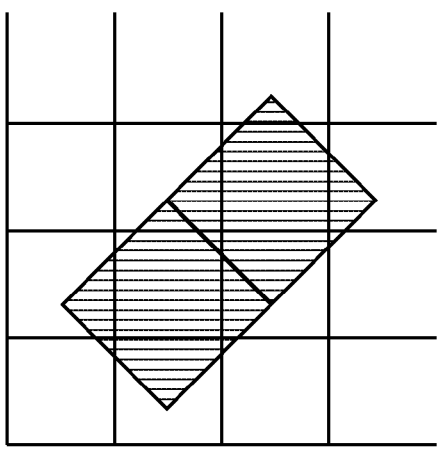
Figure 14A:
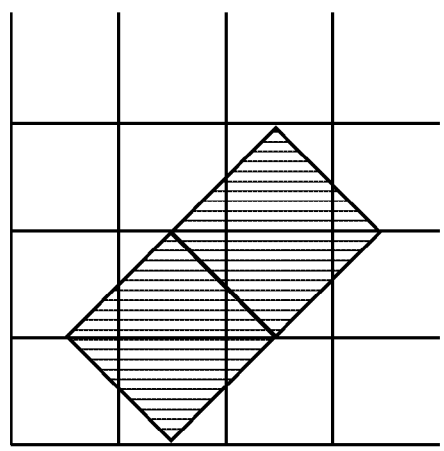

Translating Edge Assumptions:

Using a point near the exact center of the sub-pixel as the resample point, in some cases, may be simplified by changing the edge assumptions. A simplifying assumption of placing a target layout (such as shown in the '225 application and other applications incorporated herein) on top of 4 source pixels may result in diamonds and boxes that may be out-of-phase with the input pixels. One example is seen in FIGS. 13A, 13B, and 13C—depicting the red, green and blue resample areas respectively. Translating all the resample points together is not a simplification since the choice of edge alignment could be arbitrary. In many of the layouts, a slight shift to the left of all the resample points resulted in much simpler filters and sharper greens. For example, such suitable shifts result in the resampling areas seen in FIGS. 14A, 14B, and 14C.

Figure 15:
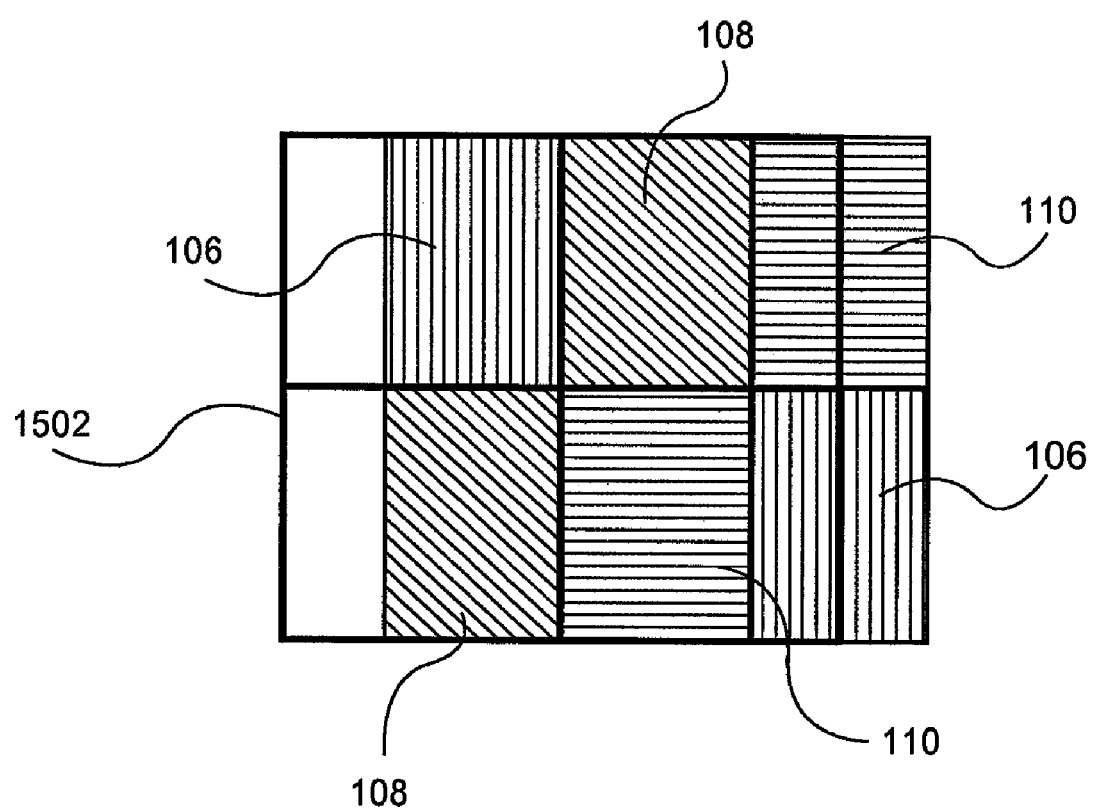
FIG. 15 is another embodiment of the relative position of a 3-color target subpixel layout shifted with respect to an input image data grid.
Figure 16C:
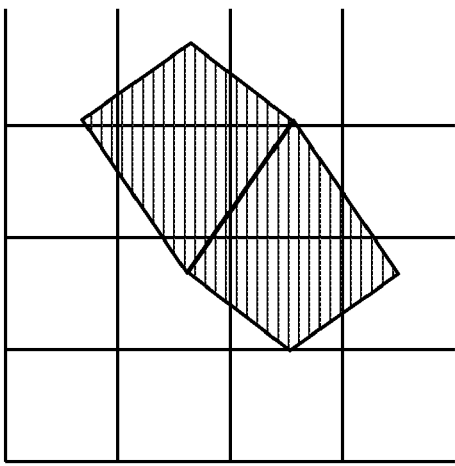
FIG. 16A through 18C are examples of various resample areas for the example of FIG. 15.
Figure 16B:
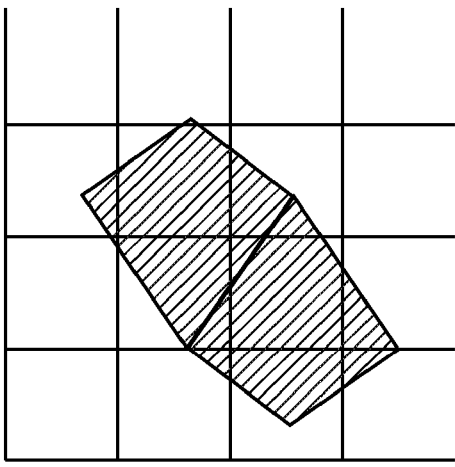
Figure 16A:
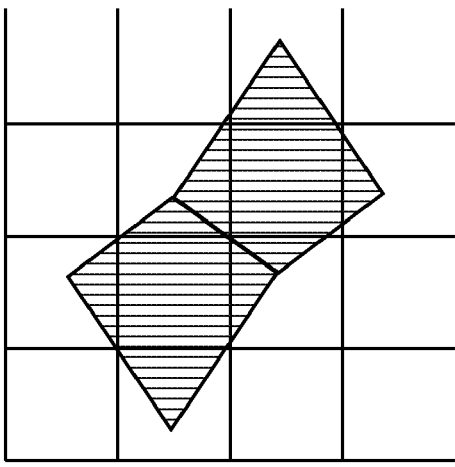

Adjusting Center Locations:

When points close to the exact sub-pixel center are used as the resample points for the layout shown in FIG. 15 (e.g. two blue subpixels 110 staggered within a substantially checkerboard pattern of red and green subpixels), a large set of different filters may result. For example, FIGS. 16A, 16B and 16C are one possible set of filters for such a layout.

Figure 17C:
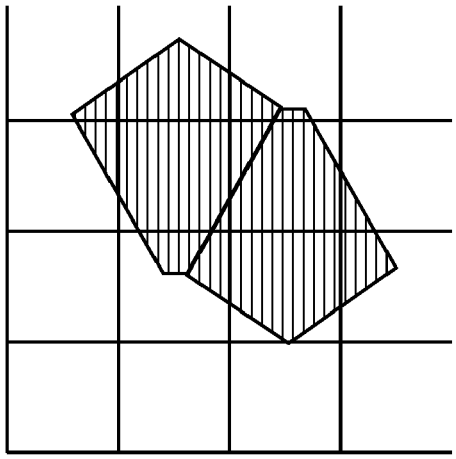
Figure 17B:
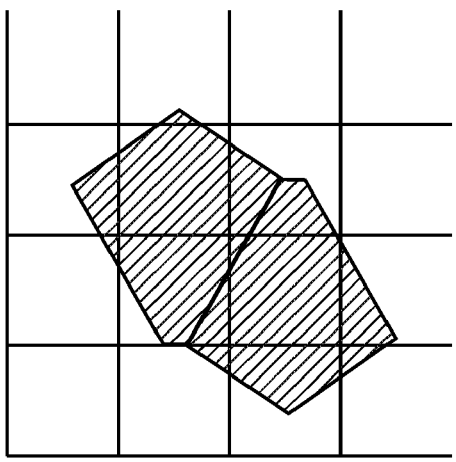
Figure 17A:
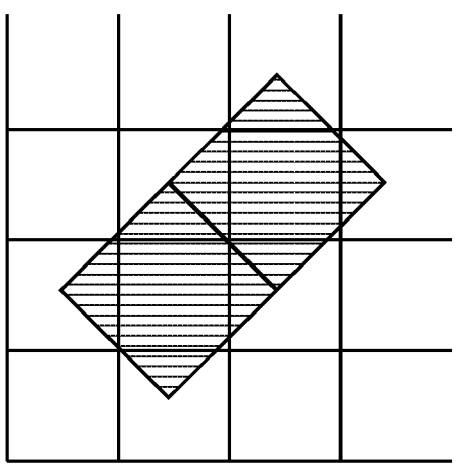
Figure 18C:
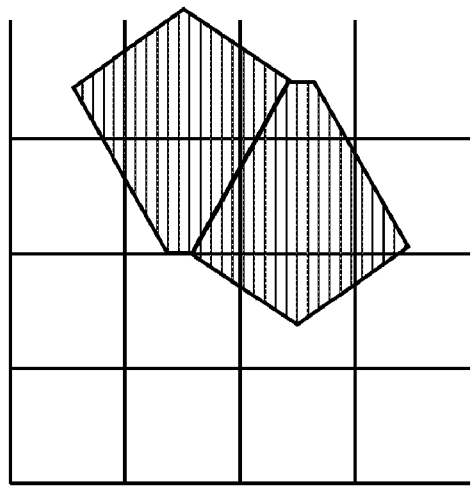
Figure 18B:
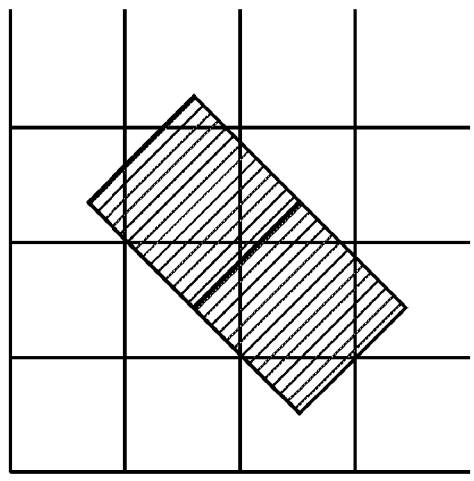
Figure 18A:
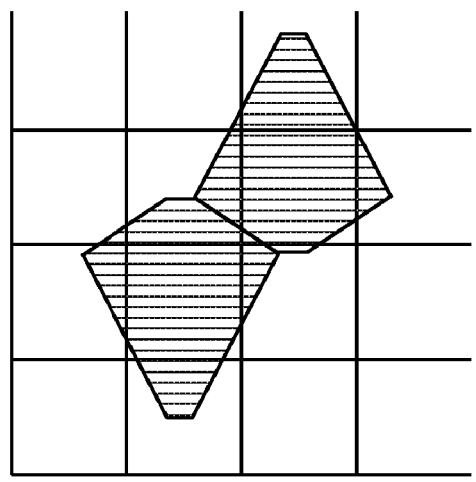

In another embodiment, both the red resample points can be moved slightly to make the red filter areas diamonds, as may be seen in FIG. 17A—with FIGS. 17B and 17C depicting the green and blue filters respectively. Yet another embodiment might be a combination of translation and adjustments to make the two green areas the diamonds—while the red and blue would remain "kites", as is shown in FIGS. 18A, 18B and 18C. This may have the effect of keeping green sharper. Since green has most of the luminosity, this may result in a sharper total image. In addition, having all the green resample points centered on input pixels would allow them to be sharpened with cross-color sharpening.

Decimation Filters:

Adjusting the relationship between source pixels and the subpixels in the layout shown in FIG. 15 might also help with decimating RGB data into such a display. As may be seen in FIG. 15, there may be a red or a green sub-pixel completely inside each source pixel. In a simple-to implement hardware decimation mode, the correct red or green primary value from the underlying RGB pixel could be copied directly into the target sub pixels. The blue sub-pixels may be split and may be averaged or even have one of the two source blue values used arbitrarily without noticeable problems in the image.

If the edges of the source pixels are aligned with the target layout, one of the green sub pixels may be split between two source pixels. Averaging the two source greens may produce a fuzzy image; while picking one source value may result in some degradation of image quality. Alternatively, the remapping grid 1502 could be shifted between the source pixels so that the green sub pixels are not split, as may be seen in FIG. 15. This will result in one of the red sub pixels being split between two source pixels, but since green contributes more to the luminosity of the image, splitting one of the reds may not degrade the image as much.

While disclosure of invention is provided herein with reference to exemplary embodiments, it will be understood by those skilled in the art to which this disclosure pertains that various changes may be made and equivalents may be substituted for elements thereof without departing from the spirit and scope of the disclosure. In addition, many modifications may be made to adapt a particular situation or material to the teachings provided herein without substantially departing from the essential scope thereof. Therefore, it is intended that the disclosure of invention provided here not be limited to the particular exemplary embodiments disclosed herein, but rather that various other embodiments falling within the scope of the teachings be deemed to be appropriately covered by the claims.

What is claimed is:

1. A method that defines respective subpixel drive signals for driving respective subpixels of a display panel and thereby causes rendering of an image on the display panel in response to supplied input image data, where the input image data defines an input image grid having pixels of different colors; and where said display panel is substantially tessellated by a subpixel repeating group comprising at least a first subpixel providing a substantially white output and at least second and third subpixels providing respective non-white and different color outputs; said method being implemented in a digital signal processor and comprising:

receiving the input image data that substantially defines the image to be rendered on said display panel;

if not provided by the supplied input image data, converting the input image data into input color planes data representing respective white and non-white input color plane grids that are superimposable over the tessellated subpixel repeating groups of the display panel and also converting the input image data into luminance plane data representing a luminance plane grid that is superimposable over the tessellated subpixel repeating groups and that corresponds to luminance contributions assignable to a totality of the multi-colored image defining data in the supplied input image data;

for each individual one of hypothetically superimposed ones of the white and non-white input color plane grids and its respective first or other same-colored subpixels, relying on predefined resample areas to compute for each same-colored subpixel, a respective output luminance value by multiplying data values provided by same-colored grid areas of the respective same-colored input color plane grid by spatially corresponding coefficients of a predefined, area resampling filter;

said area resampling filter defining a matrix of spatially distributed coefficients arranged such that each coefficient represents a corresponding fractional contribution by one of said data values to the predefined resample area of said same-colored subpixel;

using the luminance plane data to respectively sharpen the output luminance values of one or more of the respective differently colored subpixels of the tessellated subpixel repeating groups; and using the post sharpening output luminance values to generate the respective subpixel drive signals for driving the respective subpixels of the display panel.

2. The method of claim 1 wherein a normalized sum of said coefficients in the area resampling filter equals one.

3. A display system comprising:

a display panel substantially comprising a subpixel repeating group tiled across said panel in a regular pattern; said subpixel repeating group comprising at least one white subpixel and a plurality of colored subpixels in at least two primary colors;

input circuitry configured to receive input image data indicating an image for rendering on said display panel; and subpixel rendering circuitry configured to compute an output luminance value for each subpixel of said display panel by multiplying data values of a spatial portion of said input image data by at least one image filter kernel; said image filter kernel comprising a matrix of coefficients arranged such that each coefficient represents a fractional part of one of said data values of said spatial portion of said input image data; said subpixel rendering circuitry being further configured to sharpen said output luminance values using a luminance signal.

4. The display system of claim 3 wherein a normalized sum of said coefficients in the image filter kernel equals one.

5. A display system comprising:

drive circuitry that defines respective subpixel drive signals for driving respective subpixels of a display panel used with the display system and thereby providing for rendering of an image on the display panel in response to supplied input image data, where the input image data defines an input image grid having pixels of different colors; and where said display panel is substantially tessellated by a subpixel repeating group comprising at least a first subpixel providing a substantially white output and at least second and third subpixels providing respective non-white and different color outputs; said drive circuitry including:

a receiver for receiving the input image data that substantially defines the image to be rendered on said display panel;

a converter for converting the input image data into input color planes data representing respective white and non-white input color plane grids that are superimposable over the tessellated subpixel repeating groups of the display panel and for also converting the input image data into luminance plane data representing a luminance plane grid that is superimposable over the tessellated subpixel repeating groups and that corresponds to luminance contributions assignable to a totality of the multicolored image defining data in the supplied input image data;

a color planes resampler useable for a corresponding individual one of hypothetically superimposed ones of the white and non-white input color plane grids and its respective first or other same-colored subpixels, the color planes resampler relying on predefined resample areas to compute for each same-colored subpixel, a respective output luminance value by multiplying data values provided by same-colored grid areas of the respective same-colored input color plane grid by spatially corresponding coefficients of a predefined, area resampling filter;

wherein said area resampling filter defines a matrix of spatially distributed coefficients arranged such that each coefficient represents a corresponding fractional contribution by one of said data values to the predefined resample area of said same-colored subpixel;

a color planes sharpener that uses the luminance plane data to respectively sharpen the output luminance values of one or more of the respective differently colored subpixels of the tessellated subpixel repeating groups; and an output circuit that uses the post sharpening output luminance values to generate the respective subpixel drive signals for driving the respective subpixels of the display panel of the display system.

6. A method used in conjunction with displaying an image on a display panel, said display panel comprising a subpixel repeating group including at least one white subpixel and a plurality of primary color subpixels, where the method generates image data signals that substantially define an image to be rendered onto said display panel, and said method comprises:

receiving and storing input image data signals that are to be used for rendering a corresponding image on said display panel;

computing an output luminance value for each subpixel of an individual color plane by multiplying data values of a spatial portion of said input image data signals by at least one image filter kernel, said each individual color plane being formed by white subpixels and by same-colored primary color subpixels; said image filter kernel comprising a matrix of coefficients arranged such that each coefficient represents a fractional part of one of said data values of said spatial portion of said input image data;

sharpening said output luminance values with a luminance signal; and producing the generated image data signals from the sharpened output luminance values.

\* \* \* \* \*